United States Patent
Bhesania et al.

(10) Patent No.: US 7,506,219 B2
(45) Date of Patent: Mar. 17, 2009

(54) STATUS INDICATORS FOR UNIVERSAL SERIAL BUS (USB) PORTS

(75) Inventors: Firdosh K. Bhesania, Kirkland, WA (US); Mark E. Maszak, Sammamish, WA (US); John Charles Dunn, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 11/214,675

(22) Filed: Aug. 30, 2005

(65) Prior Publication Data

US 2006/0282567 A1 Dec. 14, 2006

Related U.S. Application Data

(63) Continuation of application No. 11/138,106, filed on May 26, 2005.

(51) Int. Cl.
*G06F 11/00* (2006.01)
(52) U.S. Cl. ........................................................ 714/57
(58) Field of Classification Search .................... 714/57
See application file for complete search history.

(56) References Cited

U.S. PATENT DOCUMENTS

| 5,995,012 | A  | * | 11/1999 | Lee et al. ............... 340/815.45 |
| 6,752,321 | B1 | * | 6/2004 | Leaming ..................... 235/492 |
| 6,832,271 | B1 | * | 12/2004 | Ivan et al. ..................... 710/15 |
| 7,096,155 | B2 |   | 8/2006 | Chen |
| 2003/0225954 | A1 | * | 12/2003 | Wu ............................. 710/305 |
| 2004/0260850 | A1 | * | 12/2004 | Yu et al. ..................... 710/104 |
| 2005/0021881 | A1 |   | 1/2005 | Asano et al. |
| 2005/0138475 | A1 | * | 6/2005 | Stevens ....................... 714/36 |
| 2005/0188231 | A1 |   | 8/2005 | Lai |
| 2005/0226104 | A1 | * | 10/2005 | Nishida et al. ............. 369/30.1 |

* cited by examiner

*Primary Examiner*—Marc Duncan

(57) ABSTRACT

A system for identifying data connection attributes is disclosed. The system comprises a connection monitor that identifies an operational attribute of a data connection. The system also includes a signal module that activates operation of a status indicator of the data connection such that a manner of operation of the status indicator is associated with the operational attribute. Methods for operating the system are also disclosed.

17 Claims, 14 Drawing Sheets

STATUS INDICATORS FOR UNIVERSAL SERIAL BUS (USB) PORTS

CROSS-REFERENCE TO RELATED APPLICATION(S)

This application is a continuation of and claims the benefit of U.S. Non-provisional application Ser. No. 11/138,106, filed May 26, 2005, titled "INDICATING DATA CONNECTION AND STATUS CONDITIONS", the content of which is hereby incorporated by reference.

BACKGROUND

Modern computers, especially personal computers, typically interact with a variety of other computing devices and specialized peripheral devices. Such peripheral devices can include optical scanners, printers, audio input sources, audio speakers, video cameras, and still digital cameras, among others. Many of these devices can employ a standardized data connection and protocol to transmit information from the peripheral device to a system (for example, PC, server, cellphone etc). The data connection used can be wired or wireless. Among the most common wired connections are universal serial bus (USB), IEEE 1394 (FireWire), ATA, SATA, PCI, PCI Express, PCMCIA, and ExpressCard, and others. Common wireless connections include code division multiple access (CDMA) connections, time division multiple access (TDMA) connections, global system for mobile communications (GSM) connections, IEEE 802.11x (WiFi) connections, IEEE 802.16 (WiMax) connections, and Bluetooth connections, among others.

Data connections such as those described above can be arranged in a variety of topologies, many of which can be quite complex. Various operational parameters, including specific operational requirements for peripheral devices, can further complicate data communications. An average computer user usually lacks the technical ability to diagnose and correct problems with data communications. Additionally, the average user commonly has no desire to troubleshoot such problems. The typical user simply wants his peripheral device to work when connected. If there is a problem, that user simply wants to be able to identify and correct the problem quickly and easily.

Commonly, status indicators associated with data connections are limited to indicating whether a connection is present and whether an active data transfer is occurring. Ethernet connections also indicate whether a data collision is occurring but otherwise are similarly limited. Current systems lack an intuitive and instructive way to diagnose and correct data connection problems. Typical systems also lack means to easily identify a specific data connection problem so that the problem can be corrected. Also, common systems fail to provide a means to easily identify a specific data connection that is a cause of connection problems from among the many data connections that possibly can be in use. Such shortcomings can be a great source of frustration for the average computer user.

SUMMARY

The following presents a simplified summary in order to provide a basic understanding. This summary is not an extensive overview. It is neither intended to identify key or critical elements nor to delineate scope. Its sole purpose is to present some concepts in a simplified form as a prelude to a more detailed description that is presented later. Additionally, section headings used herein are provided merely for convenience and should not be taken as limiting in any way.

A connection monitor can be associated with a data connection port and can monitor various aspects of the operation of the data port. If a trouble condition is found, the connection monitor can send information about the trouble condition to a signal module. The signal module can activate and control operation of a status indicator, such as a light, a group of lights, or a display that is associated with the data port to indicate the presence of the trouble condition.

A connection monitor can monitor operation of a data port. The connection monitor can access a diagnostic module that can determine a cause of an operational error detected by the connection monitor. The diagnostic module can be a local module or can be a diagnostic server located on a remote computer. A signaling module can access information about the cause of the operational error and cause a light or other status indicator associated with the data port to operate in a predetermined fashion, such as by burning steadily, blinking, or changing color, among others. The predetermined fashion of operation of the status indicator can be used to identify the error condition that was detected.

A connection monitor can monitor operation of a data port and specifically can monitor an authentication status for either a device connected to the data port, a user of that connected device, or both. The connection monitor can cooperate with a countermeasure device to prevent data connections by unauthorized devices or users. A signaling module can access authentication information and cause a light or other status indicator associated with the data port to operate in a predetermined fashion, such as by burning steadily, blinking, or changing color, among others. The predetermined fashion of operation of the status indicator can be used to identify the authentication condition that was detected.

A power monitor can monitor power conditions of a data port. A connection monitor can access information from the power monitor to determine whether a power-related problem is present. A signaling module can access information about the power-related problem and cause a light or other status indicator associated with the data port to operate in a predetermined fashion, such as by burning steadily, blinking, or changing color, among others. The predetermined fashion of operation of the status indicator can be used to identify the problem that was detected.

A capacity monitor can monitor capacity-related conditions of a data port, including bandwidth usage and reservation conditions. The capacity monitor can access information from a connection monitor to determine whether a capacity-related problem is present. A signaling module can access information about a detected capacity-related problem and cause a light or other status indicator associated with the data port to operate in a predetermined fashion, such as by burning steadily, blinking, or changing color, among others. The predetermined fashion of operation of the status indicator can be used to identify the problem that was detected.

The disclosed and described components and methods comprise the features hereinafter fully described and particularly pointed out in the claims. The following description and the annexed drawings set forth in detail certain illustrative aspects. These aspects are indicative, however, of but a few of the various ways in which the disclosed components and methods can be employed. Specific implementations of the disclosed and described components and methods can include some, many, or all of such aspects and their equivalents. Variations of the specific implementations and examples presented herein will become apparent from the following detailed description when considered in conjunction with the drawings.

DETAILED DESCRIPTION

Figure 1:
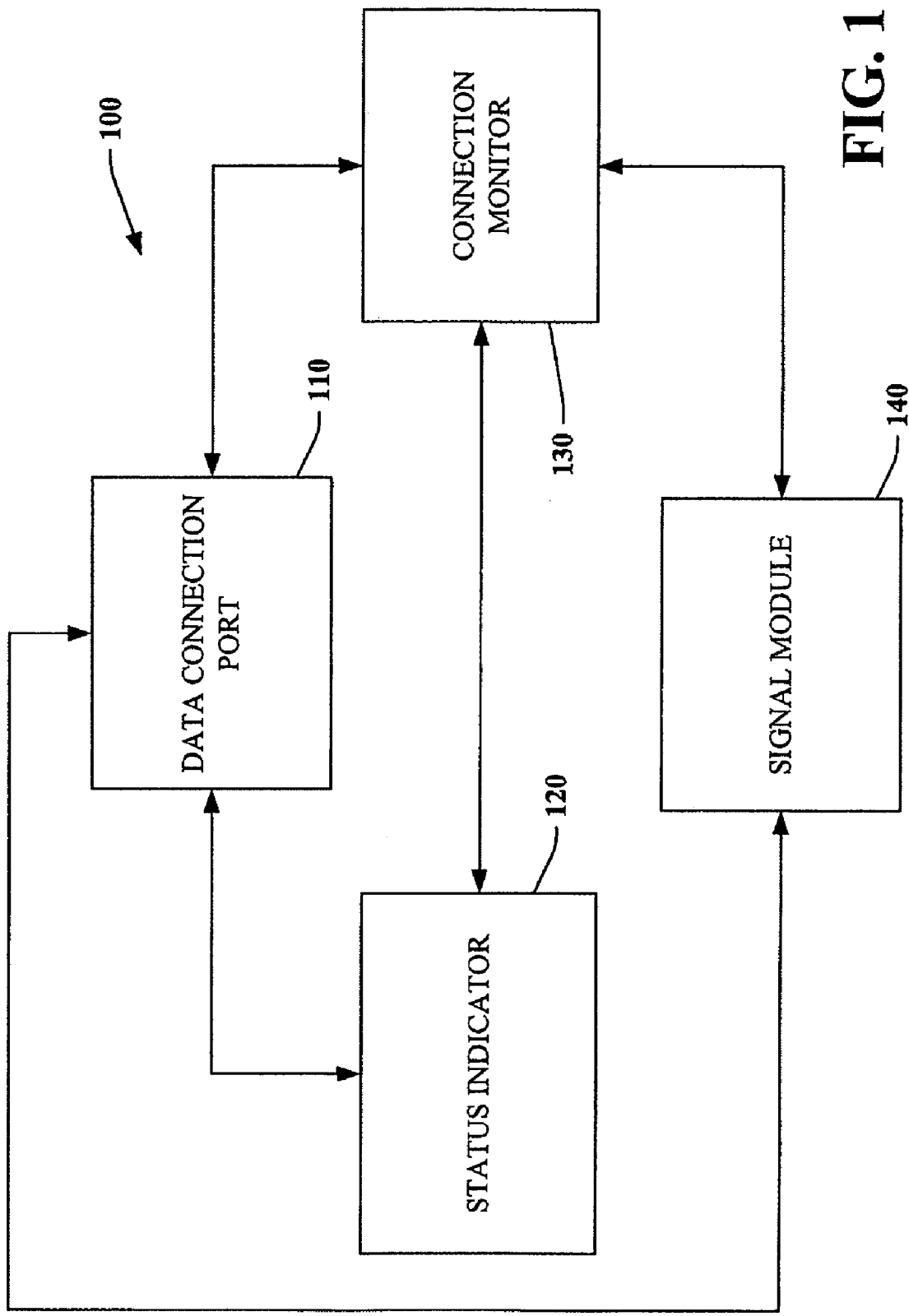
FIG. 1 is a system block diagram of a data port signaling system.

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

Disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description. Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

FIG. 1 is a system block diagram of a data port signaling system 100. The data port signaling system 100 includes a data connection port 110. The data connection port 110 can be a port for a wired connection such as a universal serial bus (USB) port, an IEEE 1394 port, an ATA port, an SATA port, an IEEE 1394 (FireWire) port, a PCI port, a PCI Express port, a PCMCIA port, or an ExpressCard port, among others. The data connection port 110 can also be a port for a wireless data connection such as a code division multiple access (CDMA) connection, a time division multiple access (TDMA) connection, a global system for mobile communications (GSM) connection, an IEEE 802.11x (WiFi) connection, an IEEE 802.16 (WiMax) connection, a wireless USB connection, an ultra wide band (UWB) connection, or a Bluetooth connection, among others.

The data connection port 110 is connected to a status indicator 120. In many of the examples set forth herein, the status indicator 120 can be a light or a group of lights. Such lights can be one or more light emitting diodes that can be a single color, can blink/flash or can be capable of changing colors. The status indicator 120 can also be some other type of indicator such as a pop-up button, a vibrating component, or an audible indicator such as a buzzer or speaker. Other suitable status indicators can be used as well. Depending upon a specific implementation, suitability of a particular status indicator can vary.

A connection monitor 130 monitors a variety of connection conditions on the data connection port 110. Such connection conditions can include available and reserved bandwidth, available power for devices that draw power from the data connection, a mismatch between a data transfer capacity of a device and a port to which it is connected, a connection of an unauthorized device, or use of a device by an authorized user. Connection conditions can also include various trouble conditions such as errors in data transfer operations. It should be noted that trouble conditions do not include data collisions such as those that occur as part of the normal operation of an Ethernet connection, for example. A skilled artisan will readily recognize that the foregoing list is exemplary only and that the connection monitor 130 (as well as other connection monitors described herein) can be employed to monitor any attribute of the specific data connection port 110 with which it is implemented.

Specifically, the connection monitor 130 can identify operational aspects of the port itself. For example, the connection monitor 130 can identify whether a data connection port with which it is identified has debugging capabilities or whether that port supports a certain minimum data transfer rate, among others. Specifics of data port capabilities can and usually will vary according to the type of data connection port and a particular standard or version of a standard supported or implemented by that data port. The connection monitor 130 can use information from such standards to identify data port capabilities. Also, the connection monitor 130 can identify a severity level of an operational aspect of the data connection port. For example, the connection monitor 130 can classify a failure of a device to properly enumerate on a USB port as more severe than a need for such a device to operate at a slower data transfer rate because of a mismatch between maximum data transfer rates of a device and a port at which the device is connected. Other scenarios are possible and will be readily apparent to those of ordinary skill in the art.

A signal module 140 can communicate with the connection monitor 130 and the status indicator 120. The signal module 140 can use information from the connection monitor 130 to activate and control operation of the status indicator 120. The signal module can also communicate with other components (not shown) to provide such functions as event logging and smart calculations, among others. In such instances the connection monitor 130 can communicate information that identifies a specific condition of the data connection port 110 to the signal module 140. The signal module 140 can then associate that information with a pattern of operation that can be used to identify the specific condition. Using that pattern of operation, the signal module 140 can cause the status indicator 120 to operate in accordance with that pattern and thereby provide an indication as to the specific condition detected by the connection monitor 130.

One example of a possible implementation follows. The data connection port 110 can be a USB port, specifically a USB port that supports the USB 1.1 standard. The status indicator 120 can be a light emitting diode that is positioned next to the USB port. A device that operates in accordance with the USB 2.0 specification, and provides throughput in the range of 12-480 Mbps is called a high-speed device. High-speed devices can be connected to a USB 1.1 (low/full speed) port. However, data transfer rates of the high-speed device will be limited to full speed. In this case, the connection monitor 130 can detect the presence of the high-speed device on the low-speed port. The connection monitor 130 can indicate the existence of this condition to the signal module 140. The signal module 140 can activate the light emitting diode of the status indicator 120 to indicate that the data connection port 110 is operating in conjunction with a device in a manner that is outside normal operating parameters. Additionally or alternatively, the signal module 140 can activate a light emitting diode or a status indicator of another data connection port to which the high speed device should be connected. For example, the signal module 140 can activate a light emitting diode of a USB 2.0 data port that has high-speed capabilities and to which the high-speed device can be connected.

Some USB devices draw power while connected. Power conditions of the port and its associated connection can be monitored as well. For example, a connected USB device can draw excess current from its upstream port. This can cause an over-current condition. An over-current condition can also be caused by connecting a high-power device to a low-power port. In this case, the connection monitor 130 can detect that the power condition of the port 110 is outside normal operating parameters and send an indication of this condition to the signal module 140. The signal module 140 can then activate a light emitting diode acting as the status indicator 120 and cause the light emitting diode to blink on and off to indicate the existence of the over-current condition. Additionally or alternatively, the signal module 140 can record an entry in an event log that describes this occurrence. Such entry can include a hardware identifier as well as information about the device that generated the event. Instead of logging the event itself, the signal module 140 can send information to another component that can log the information. The other logging component can be software running on a computer or can be a specialized device, among other things.

Many USB devices, especially USB devices using isochronous transfers, and specifically such devices as video cameras and speakers, among others, are able to reserve a guaranteed percentage of available bandwidth for their use. When connecting more than one such device to a single host controller, for example through the use of a hub, it is possible to have an amount of requested reserved bandwidth exceed a total amount of bandwidth available on the data connection port 110. This situation can also occur when more than one device is connected to the same USB 1.1 host controller. The connection monitor 130 can detect this condition and notify the signal module 140. The signal module 140 can then activate the light emitting diode of the status indicator 120 to signify which port is affected by the out of bandwidth condition. Additionally or alternatively, if more than one data connection port 110, each with an associated status indicator 120, is in use, this signal module 140 can activate other status indicators 120 that are associated with data connection ports 110 to indicate which of such ports are available to provide needed bandwidth.

In some cases, a connected USB device can fail to properly enumerate itself and will not be recognized by a computing system to which it is attached. In this case, the connection monitor 130 can inform the signal module 140 that a connected device has not been recognized. The signal module 140 can then activate a light emitting diode of the status indicator 120 to indicate which specific device has not been recognized.

In other cases, it may be desirable to indicate which USB ports have system debugging capability. The signal module 140 can activate the status indicator 120 of the data communication port 110 that has such debugging capabilities. Also, the signal module 140 can activate the status indicator 120 of the data communication port 110 to indicate whether the data communication port 110 is a high speed or a low-speed port. For instance, the signal module 140 can activate the status indicator 120 of a data communication port 110 if the data communication port 110 is a high-speed port. Additionally or alternatively, the signal module 140 can cause a light emitting diode of the status indicator 120 of the data communication port 110 to glow a first color for a high-speed port and a second color for a low speed port.

It should be appreciated that although various examples set forth herein depict components associated with USB connections, such examples are not limiting and are merely for the purpose of illustrating possible implementations. Those of ordinary skill in the art will readily recognize that examples presented herein can, with minor modifications, be adapted for other implementations based upon other data connection technologies. The lack of a specific example using a specific data connection technology should not be interpreted as suggesting or implying that an implementation using that technology is not possible.

Figure 2:
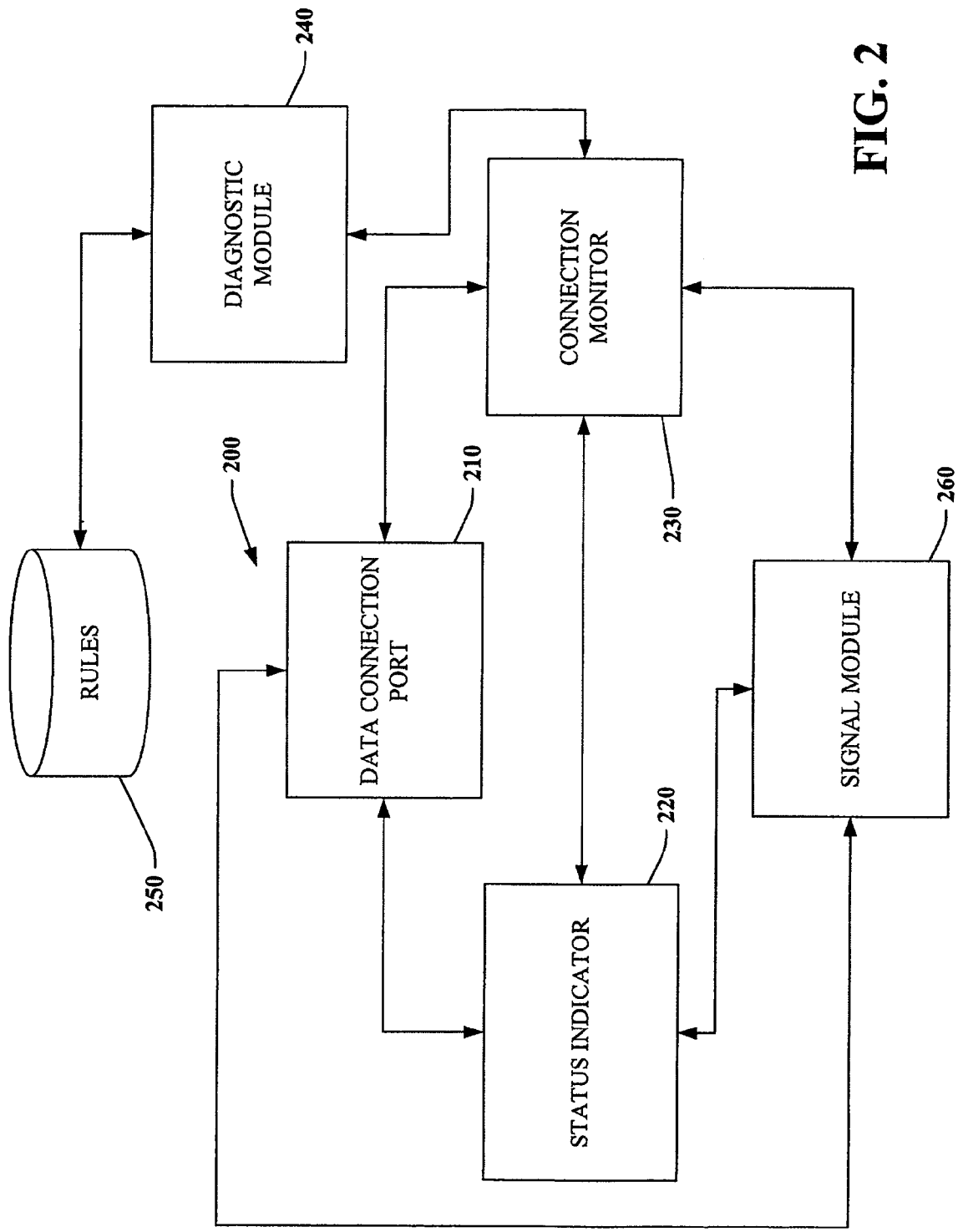
FIG. 2 is a system block diagram of a data port signaling system.

FIG. 2 is a system block diagram of a data port signaling system 200. The data port signaling system 200 includes a data connection port 210. The data connection port 210 can be a USB port or another type of data connection. Other types of data connections that are specifically contemplated include the wired and wireless data connections described in conjunction with FIG. 1. A port status indicator 220 is associated with the data connection port 210. The port status indicator 220 can be a single light emitting diode or group of light emitting diodes or can be implemented differently, such as by using audible indicators such as speakers or buzzers, mechanical pop-up indicators, or other suitable indicators. A connection monitor 230 is coupled with the data connection port 210 and can monitor various operational aspects of the data connection port 210. As discussed in conjunction with various aspects of the system depicted in FIG. 1, details of specific attributes of the data connection port 210 will vary according to implementation.

The connection monitor 230 can communicate with a diagnostic module 240. The diagnostic module 240 can use information regarding attributes of the data connection port 210 sent by the connection monitor 230 to identify specific data connection problems and to suggest potential solutions for those data connection problems. To do so, the diagnostic module 240 accesses rules from a rules data store 250. The rules data store 250 can be a specialized device or can be software in execution upon a computer. The rules data store 250 can contain information pertaining to data connection specifications, for example, the USB 2.0 standard, the IEEE 1394 standard, the IEEE 802.11x standard, or other standards. The diagnostic module 240 provides a mechanism by which more complex data communication problems can be identified and fixed. For instance, the USB 2.0 standard provides that hubs should not be layered more than five deep on any single root hub port. If each hub includes 4 ports, a maximum of 16 devices can be connected at a single time. Such a large number of devices, connected to one of five hubs, can make diagnosing trouble conditions exceedingly difficult.

Along with an increase in the complexity of data connection problems that can be identified by the diagnostic module 240, there can be a corresponding increase in the sophistication of signals that can be activated or created by a signal module 260. For example, if the depth of a hub exceeds the maximum depth called for by the specification, the signal module 260 can cause every light emitting diode associated with every port of the offending hub to flash. Also, if a device is added to a hub and that device causes an available bandwidth requirement to be exceeded, the signal module 260 can cause a light emitting diode associated with the port to which the device that caused the bandwidth problem is connected to flash, to glow red, or to behave in some other appropriate fashion. Additionally or alternatively, the signal module 260 can activate lights or other indicators of a suitable available hub.

It should be appreciated that the system described with reference to FIG. 2 can also be used for more general diagnostic tasks. For example, a connection monitor, such as the connection monitor 230, can be modified to accept commands from a user. Such commands can include directives to identify high-speed connection ports or debugging ports. A variety of other responses to user commands will be apparent to artisans of ordinary skill.

In connection with detection or identification tasks, various artificial intelligence-based schemes or components can be used for carrying out or implementing certain ones of the components disclosed and described herein. For example, detection of a variance from normal operating parameters can be facilitated by using an automatic classifier system and process. Moreover, when more than one component is in use, for example, multiple devices having USB data connections in a complex nested hub topology, an automatic classifier system can be used to identify operational parameters that deviate from the norm.

A classifier is a function that maps an input attribute vector, $X=(x_1, x_2, x_3, x_4, \ldots x_n)$, to a confidence that the input belongs to a class, that is, $f(X)=\text{confidence(class)}$. Such a classification can employ a probabilistic and/or statistical-based analysis (for example, factoring into the analysis utilities and costs) to predict or infer an action that a user desires to be automatically performed. In the case of data port monitoring and signaling, a classifier can identify a pattern that indicates a particular manner of operation of a data port. Upon such identification, the classifier can trigger one or more actions to be taken automatically, such as logging an event, causing a light or other status indicator to activate, or presenting a message to a user. Also, information regarding the manner of operation identified by the classifier can be sent to other components for various additional actions.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, and probabilistic classification models providing different patterns of independence can be employed. Classification as used herein also includes statistical regression that is utilized to develop models of priority.

As will be readily appreciated from the subject specification, classifiers that can be employed includes those classifiers that are explicitly trained (for example, by a generic training data) as well as implicitly trained (for example, by observing user behavior, receiving extrinsic information). For example, SVMs are configured by a learning or training phase within a classifier constructor and feature selection module. Thus, the classifier(s) can be used to automatically perform a number of functions including, but not limited to, determining whether a device should be sent data.

The diagnostic module 240 can be implemented as a neural network or as an SVM. Additionally, the diagnostic module 240 can also be implemented as an expert system. An expert system is a program that uses knowledge in different procedures to solve problems that are difficult enough to require significant human expertise for their solutions. Expert systems can emulate the decision-making ability of a human expert. Typically, an expert system includes a knowledge base and an inference engine. Such a system can be extremely useful within a limited problem domain. The knowledge base commonly can contain information that is usually completely within a specific problem domain. Given a specific fact or facts, an expert system can access information from the knowledge base about the problem domain and infer a solution to a problem described by the facts.

A knowledge base of an expert system can be loaded with information regarding normal operating parameters and operating specifications of a data connection, such as a USB connection, or another connection. The information in the knowledge base can provide a reference to determine whether an operational characteristic of a data connection is within normal operating parameters for that data connection. When operation outside normal operating parameters is detected, an expert system implemented as the diagnostic module 240 can provide a detailed solution for a networking or data connection problem. This detailed solution can then be used by the signal module 260 to operate the port status indicator 220 in such a way that problem data ports, such as the data connection port 210, or a device connected to a problem data port, can be readily identified and corrective action taken.

Figure 3:
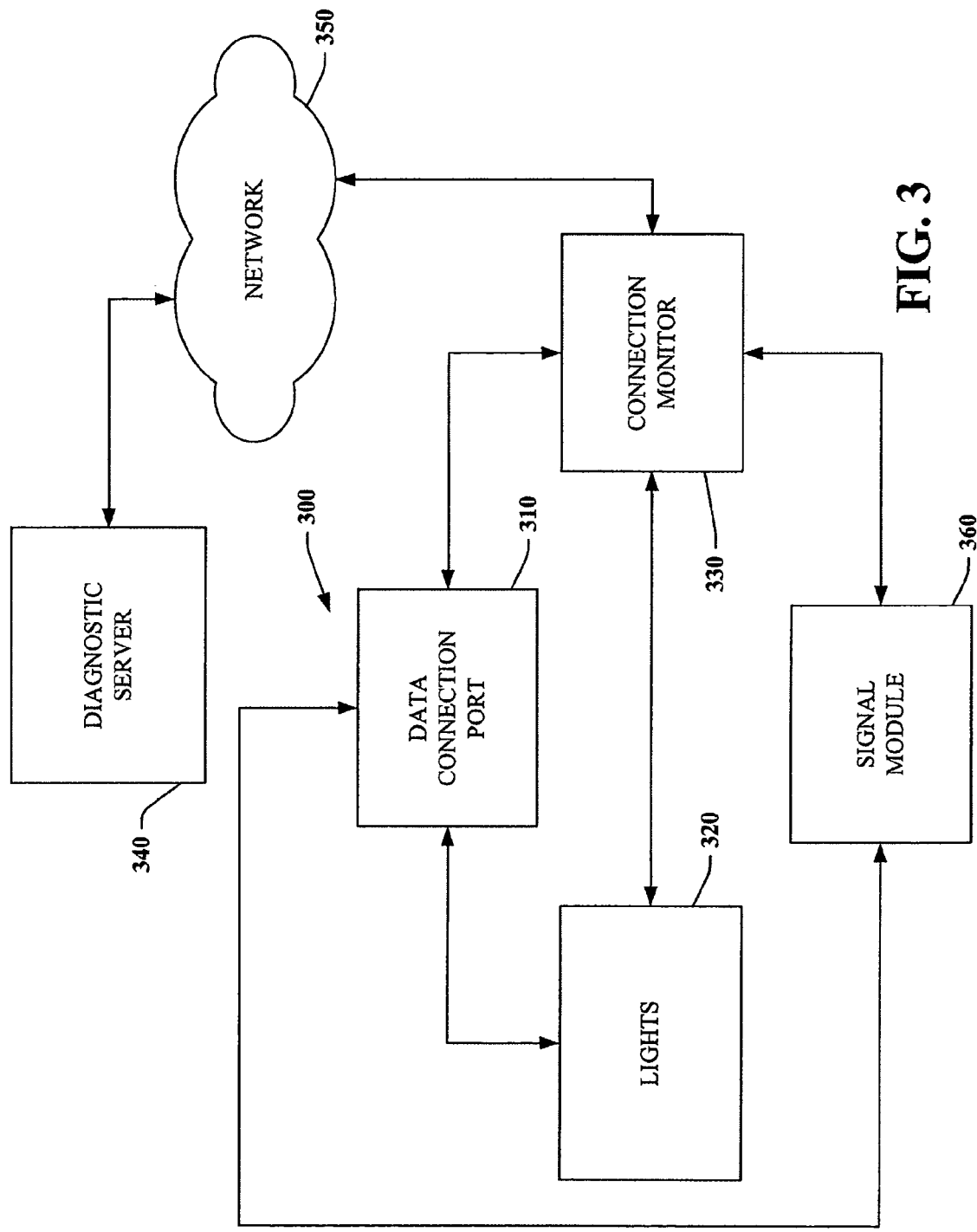
FIG. 3 is a system block diagram of a data port connection diagnostic system.

FIG. 3 is a system block diagram of a data port connection diagnostic system 300. The data port connection diagnostic system 300 includes a data port 310. The data port 310 can be a USB port or any other data connection port, specifically including the types of wired and wireless data ports previously discussed in conjunction with other figures. The data port 310 has lights 320 that are associated with it. In this specific example, as with others, lights are used. Another component, such as a buzzer, a pop-up button, a vibrating component, or some other suitable visual, aural, or tactile indicator can be used in place of the lights 320. Operation of the data port 310 is observed by an associated connection monitor 330. The connection monitor 330 can communicate with a diagnostic server 340 using a network 350. The diagnostic server 340 can transmit diagnostic information over the network 350 to the connection monitor 330. The connection monitor 330 can then use that diagnostic information to determine appropriate instructions to relay to a signal component 360. The signal component 360 can then control operation of the lights 320 in a manner that can be used to identify a specific data connection issue that occurred on the data port 310 and was identified by the diagnostic server 340.

Both the connection monitor 330 and the signal component 360 can be implemented as artificial intelligence-based components. Such components can be implemented as a neural network or an SVM, among others. Various pattern matching tasks performed by the connection monitor 330 or the signal component 360 can be performed by an artificial intelligence-based component. In the case of the connection monitor 330, a pattern that represents a manner of operation of the data port 310 can be created. That pattern can then be evaluated by a neural network or an SVM to determine whether the pattern that represents a manner of operation of the data port 310 is within a class of patterns expected during normal operation of the data port 310. In the case of the signal component 360, a pattern that represents a diagnosis or another pattern can be evaluated by an artificial intelligence-based component to determine a manner of operation for the lights 320.

The diagnostic server 340 can also be implemented as an artificial intelligence-based component, such as a neural network or an expert system. When implemented as a neural network, the diagnostic server 340 can perform pattern matching tasks to match a trouble condition of the data port 310 that was detected by the connection monitor 330 with a probable cause of that trouble condition. When implemented as an expert system, the diagnostic server 340 can locate a likely cause of the problem and infer a potential solution. In either implementation, the diagnostic server 340 sends appropriate information to the connection monitor 330 that can be used by the signal component 360 to control the lights 320.

In operation, the data port connection diagnostic system 300 will usually have a device connected to the data port 310. However, it is not necessary to have a device connected in all instances in order to perform certain monitoring functions, such as determining a data transfer rate of a data port, among others. Operation of the data port 310 (and possibly a connected device) is monitored by the connection monitor 330. When the connection monitor 330 detects operation of the data port 310 that is outside normal operating parameters, the connection monitor 330 sends information about the operation to the diagnostic server 340 over the network 350. The diagnostic server 340 uses this information to determine what caused the data port 310 to operate the outside normal parameters, and sends diagnostic information to the connection monitor 330 using the network 350. Optionally, the diagnostic server 340 can send corrective information over the network 350 to the connection monitor 330 that can be used to correct the situation that caused the operation of the data port 310 to be outside normal operating parameters. In this manner, not only the source but also a solution for a data connection problem can be determined.

Figure 4:
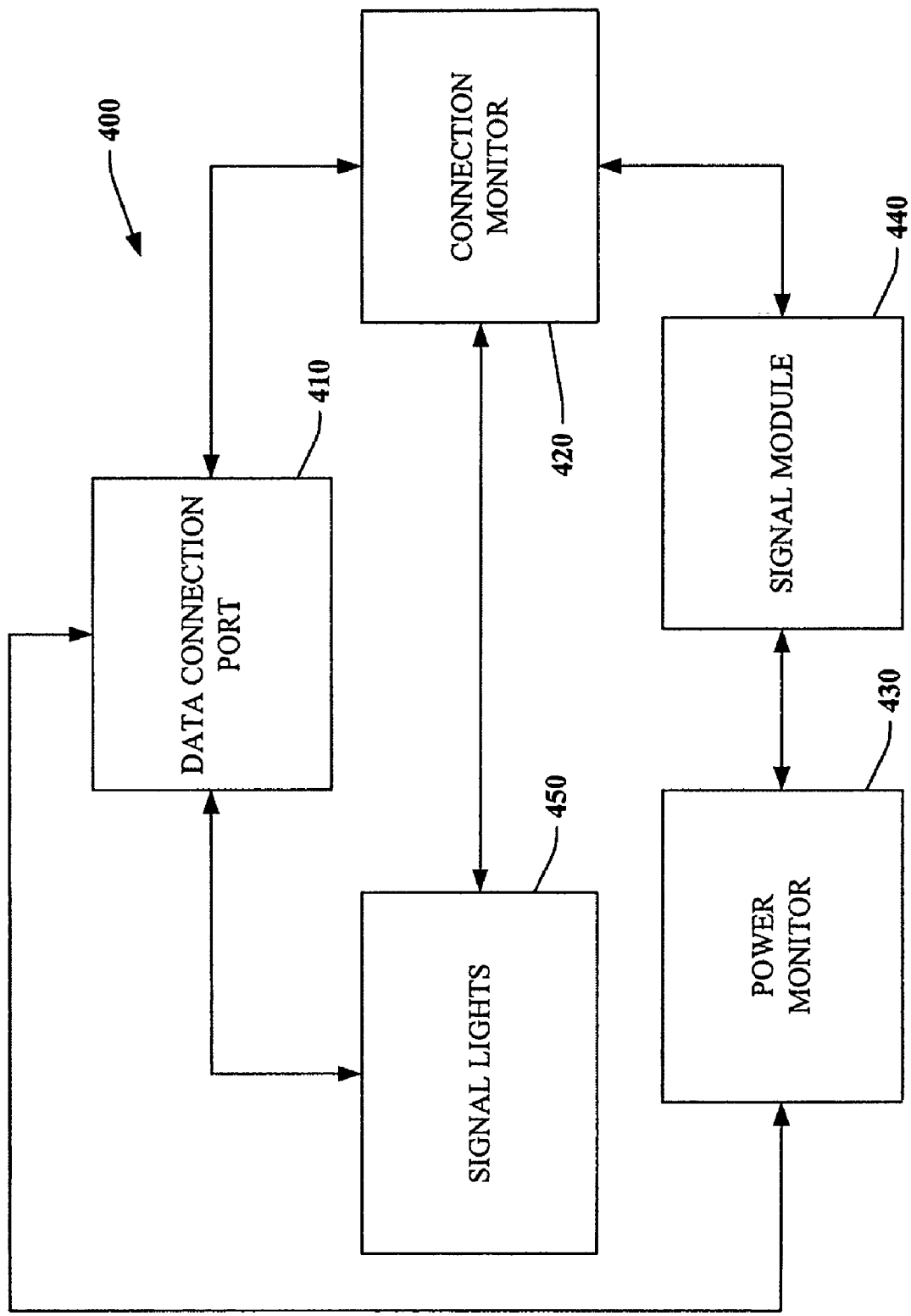
FIG. 4 is a system block diagram of a data port monitoring system.

FIG. 4 is a system block diagram of a data port monitoring system 400. The data port monitoring system 400 includes a data port 410 that can be any one of the previously described ports, or another suitable type of data port. A data port connection monitor 420 is coupled to the data port 410. A power monitor 430 can monitor power conditions of the data port 410 and can communicate with the data port connection monitor 420. A signal module 440 can obtain the information from the power monitor 430 and the data port connection monitor 420. The signal module 440 can control operation of signal lights 450 based at least in part upon information received from the power monitor 430 or the connection monitor 420.

The power monitor 430 can be implemented as an artificial intelligence-based component, such as a neural network, an SVM, or another suitable component, much as previously described in conjunction with other figures. Specifics of the power monitor 430 are largely implementation-dependent. For example, some data connections that also provide power to connected devices in accordance with various standards may provide standards for power management and monitoring as part of the data connection standard. In such cases, the power monitor 430 can be implemented in accordance with the relevant standard. The power monitor 430 can also be a separate component apart from any power manager or power monitor provided as part of a specific data communication standard.

The signal module 440 can also be implemented as an artificial intelligence-based component. Information from the connection monitor 420 or the power monitor 430 can be represented as a pattern to be interpreted or evaluated by an artificial intelligence-based component functioning as the signal module 440. Evaluation of this pattern can yield a corresponding pattern of behavior that the signal module 440 can apply to the signal lights 450. Operation of the signal lights 450 can then be used to identify a specific problem with power conditions of the data port 410. For example, the signal module 440 can cause the signal lights 450 to blink in a predetermined manner to identify a specific power condition.

In operation, the data port monitoring system 400 will typically, but not necessarily, have some device that can be connected to the data port 410. The power monitor 430 can monitor power conditions of the data port 410. The connection monitor 420 can receive input signals from the data port 410 and the power monitor 430. Upon detection of a power condition that is outside normal operating parameters, the connection monitor 420 can send information to the signal module 440 that indicates existence of such a condition. The signal module 440 can then use this information to determine whether to activate the signal lights 450. Upon activating the signal lights 450, the signal module 440 can also control a mode of operation of the signal lights 450 that can correspond to the existing condition. This mode of operation can be burning steadily, changing color, blinking, or a combination of these or other actions.

Figure 5:
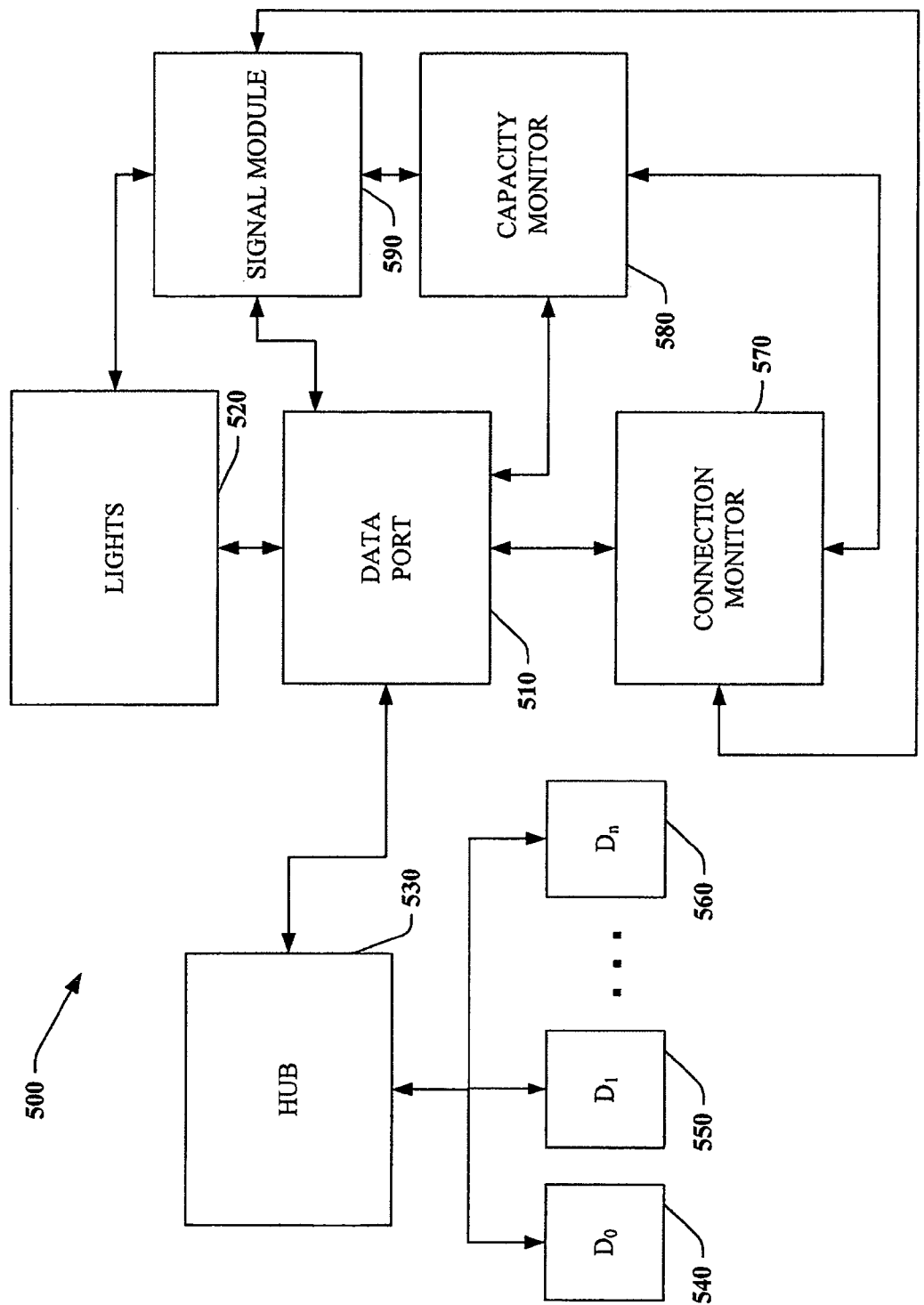
FIG. 5 is a system block diagram of a data connection monitoring system.

FIG. 5 is a system block diagram of a data connection monitoring system 500. The data connection monitoring system 500 includes a data port 510 with associated port lights 520. It should be noted that in this specific example, as with others, lights are used and described as a status indicator that is associated with the data port 510. Another component, such as a buzzer, a pop-up button, a vibrating component, or some other suitable visual, aural, or tactile indicator can be used in place of the port lights 520. A hub 530 is connected to the data port 510. The hub 530 has connected devices 540, 550, 560. A connection monitor 570 is associated with the data port 510. The connection monitor 570 can communicate with a capacity monitor 580. A signal component 590 can receive input from the capacity monitor 580 or the connection monitor 570 and can use such input to control the port lights 520.

The data port 510 can be a USB port, or another type of data connection port, such as any of the types previously described in conjunction with other figures. The hub 530 can accept input from the connected devices 540, 550, 560 and redirect that input to the data port 510. Connected devices 540, 550, 560 can be such devices as video cameras, digital cameras, personal digital assistants (PDAs), cellular telephones, personal music players, or any other device that can use a data connection.

The use of a hub, such as the hub 530, can provide the ability to connect more than one device to a single data port, such as the data port 510. However, conflicts among connected devices can occur, for example, if connected devices attempt to communicate at the same time or attempt to reserve bandwidth for their own use when such requests are not supported or when the amount of bandwidth requested is not available. The connection monitor 570 can detect such connection problems, among others. The capacity monitor 580 can monitor various capacity-related aspects of a data connection, such as bus speed and available bandwidth, among others, as well as aspects that can be specific to a connected device such as an amount of space left on a storage device or amount of power remaining in a battery-driven device. Specifically, the capacity monitor 580 can detect whether connected devices are attempting to reserve bandwidth in excess of a capacity of the data port 510. The capacity monitor 580 can indicate to the signal component 590 that an over-reservation of bandwidth has occurred. This signal component 590 can then select from among a list of behavior patterns to locate a behavior pattern that corresponds with an over-reservation of bandwidth situation and cause the port lights 520 to operate in accordance with the selected behavior pattern.

The connection monitor 570 can be implemented as an artificial intelligence-based component such as a neural network, an SVM, or another appropriate component. Similarly, the capacity monitor 580 and the signal component 590 can be implemented as artificial intelligence-based components. The capacity monitor 580 can be implemented in a wide variety of ways that will be apparent to those of ordinary skill in the art. When implemented in conjunction with a data connection that adheres to a predetermined data connection standard, such as USB, the capacity monitor 580 can perform at least some of the functions called for by the specification. Alternatively, the capacity monitor 580 can be implemented separately from, and in addition to, any capacity monitoring component required by a specification.

In operation, the data connection port 510 accepts data from the hub 530. The hub 530 redirects data signals from the connected devices 540, 550, 560. Data accepted by the data port 510 is monitored by the connection monitor 570. When the connection monitor 570 detects operation of the data port 510 that is outside defined normal operating parameters of the data port 510, the connection monitor 570 informs the capacity monitor 580 that an error condition has been detected. The capacity monitor 580 can evaluate the error condition detected by the connection monitor 570 and determine whether the error condition is related to the bandwidth capacity of the data port 510. If so, the capacity monitor 580 will inform the signal component 590 of this fact. This signal component 590 can choose from among a group of predefined operation patterns to select an operation pattern that corresponds to the situation reported by the capacity monitor 580. Each operation pattern of the group is defined to correspond to one possible trouble condition. This correspondence provides a means by which specific trouble conditions can be identified by observing the behavior of the port lights 520.

A second example of operation of the data connection monitoring system 500 follows. The data connection port 510 accepts data from the hub 530. The hub 530 redirects data signals from the connected devices 540, 550, 560. Data accepted by the data port 510 is monitored by the connection monitor 570 and the capacity monitor 580. Each of the connection monitor 570 and the capacity monitor 580 can detect certain error conditions. Sets of error conditions that can be detected by the connection monitor 570 and the capacity monitor 580 can be mutually exclusive. When either the connection monitor 570 or the capacity monitor 580 detects an error condition, the respective unit can redirect the data signal to the signal component 590. The signal component 590 can choose from among a group of predefined operation patterns to select an operation pattern that corresponds to the situation reported. Each operation pattern of the group is defined to correspond to one possible trouble condition. This correspondence provides a means by which specific trouble conditions can be identified by observing the behavior of the port lights 520.

Figure 6:
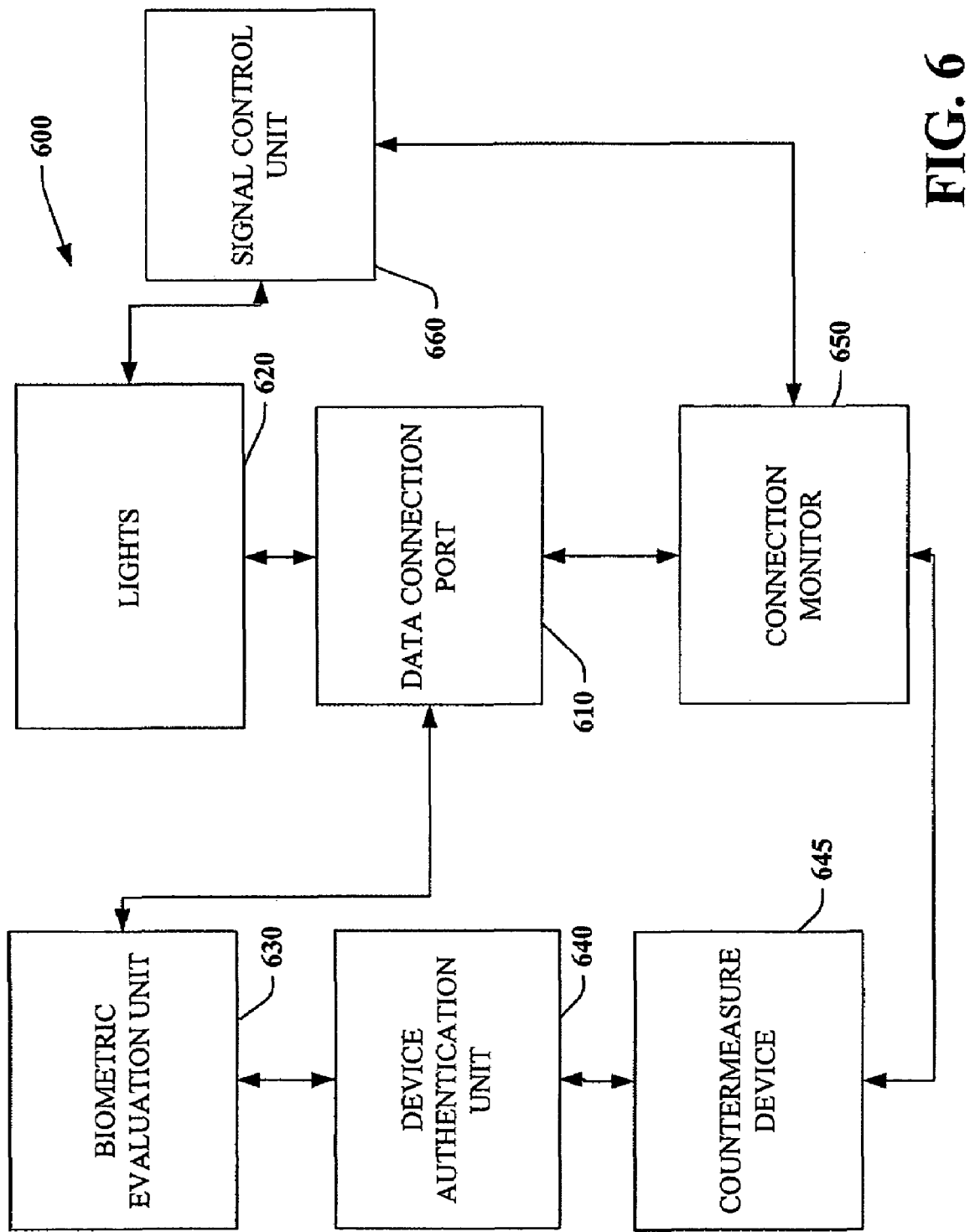
FIG. 6 is a system block diagram of a data connection system.

FIG. 6 is a system block diagram of a data connection system 600. The data connection system 600 includes a data connection port 610 with associated lights 620. It should be noted that in this specific example, as with others, lights are used and described as a status indicator that is associated with the data connection port 610. Another component, such as a buzzer, a pop-up button, a vibrating component, or some other suitable visual, aural, or tactile indicator can be used in place of the lights 620. Data communications associated with the data connection port 610 are protected by a biometric evaluation unit 630 and a device authentication unit 640. Both the biometric evaluation unit 630 and the device authentication unit 640 can communicate with a countermeasure device 645. A connection monitor 650 can communicate with the biometric evaluation unit 630 and the device authentication unit 640. The connection monitor 650 can also monitor a status of data communications of the data communication port 610. A signal control unit 660 can accept an input signal from the connection monitor 650 and can use that input to control operation of the lights 620.

As with other previously described implementations, the lights 620 that are associated with the data connection port 610 can be light emitting diodes or can be another suitable type of light. Additionally or alternatively, some type of lighted display such as a liquid crystal diode (LCD) display, an organic light-emitting diode (OLED) display, or another type of display can be used in place of the lights 620. When such displays are used, additional diagnostic information can be presented on the display. Such diagnostic information can include a cause of the detected problem or instructions on how to correct the detected problem. Such an implementation is especially useful when the connection monitor 650 is implemented as an artificial intelligence-based component such as an expert system.

The biometric evaluation unit to 630 can be used to control access to the data port 610. A variety of biometric devices can be used, such as fingerprint scanners, retina scanners, or other biometric-based authentication units. The biometric evaluation unit 630 can also include password-protection components and security token components, among others. The device authentication unit 640 can identify a specific device connected to the data port 610 and determine whether that connected device is authorized to connect to the data port 610.

Devices can be identified in a variety of ways, including by using a unique identifying number such as a serial number. More complex identification systems are also possible. The device authentication unit 640 can act as a gatekeeper to restrict access to the data port 610 to only those devices that have been previously authorized. Information pertaining to previous authorizations of devices can be stored in a data store such as an encrypted or unencrypted text file, a database, a look-up table, or another suitable data store. To authenticate a specific device, the device authentication unit 640 can obtain a unique identifier that is associated with the device. The obtained unique identifier can then be compared to a set of pre-approved device identifiers in a data store. The set of pre-approved device identifiers is a group of identifiers for devices that are deemed to be known and trusted by some authority such as a system administrator or potentially a third party. If the identifier obtained from the device is found in the set of pre-approved identifiers, the device is authenticated. If the identifier obtained from the device is not found, the device will not be authenticated. Other authentication schemes are possible and can be used.

In the case when a connected device or user of that device cannot properly be authenticated, for example, by the biometric evaluation unit 630 or the device authentication unit 640, the countermeasure device 645 can disable the data port 610, a device connected to the data port 610, or both. For example, upon a failure to authenticate by either the biometric evaluation unit 630 or the device authentication unit to 640, the countermeasure device 645 can shut down all data communication available on the data port 610. The signal control unit 660 can then activate the lights 620 in an appropriate fashion to indicate that the data port 610 has been shut down because of an authentication failure.

In one possible implementation, the countermeasure device 645 can also disable the device attached to the data port 610 by a variety of means. One possible means is by triggering a shutdown routine on the connected device. Additionally or alternatively, the countermeasure device 645 can incapacitate the data port 610 by terminating all data connections with other components. Other means of incapacitating the data port 610 or a connected device are possible.

With reference to FIGS. 7-12, flowcharts in accordance with various methods or procedures are presented. While, for purposes of simplicity of explanation, the one or more methodologies shown herein, for example, in the form of a flow chart, are shown and described as a series of acts, it is to be understood and appreciated that neither the illustrated and described methods and procedures nor any components with which such methods or procedures can be used are necessarily limited by the order of acts, as some acts may occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology or procedure.

Figure 7:
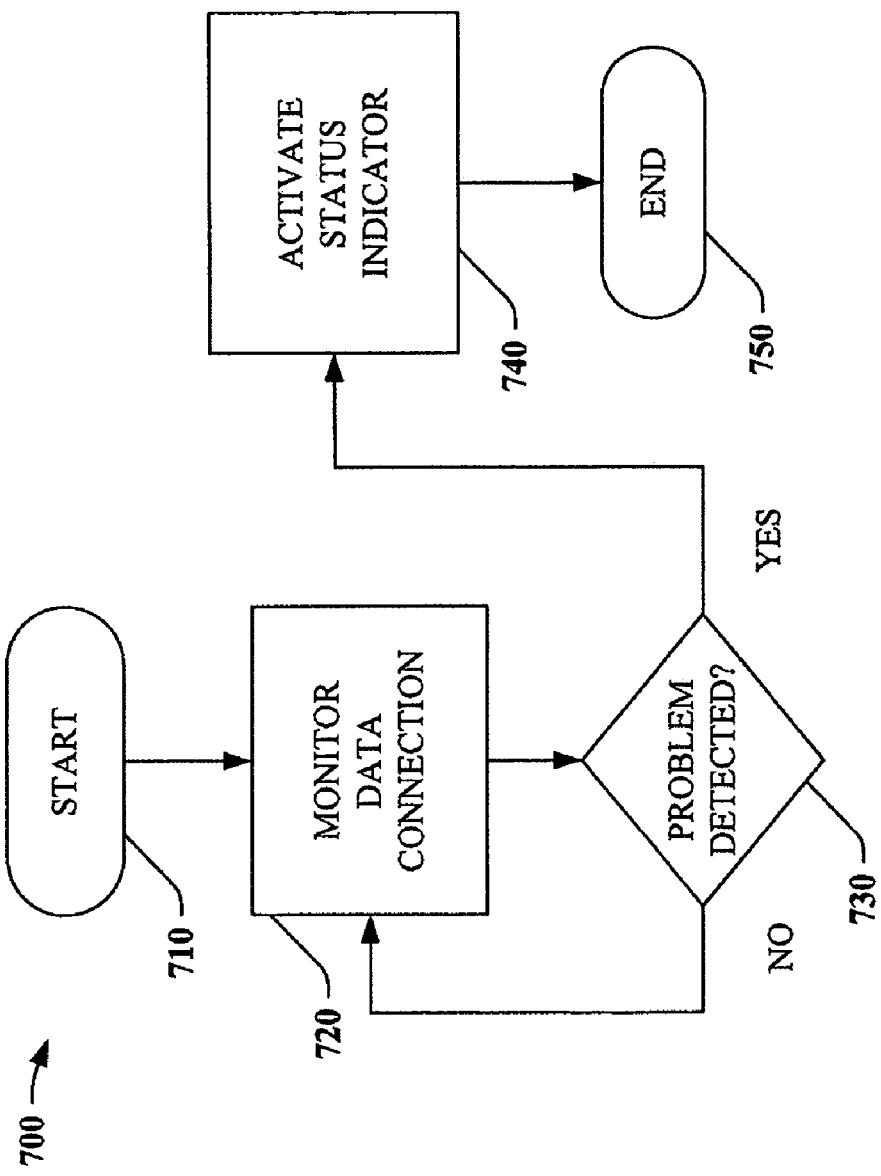
FIG. 7 is a flow diagram depicting a method that can be used with a data port signaling system.

FIG. 7 is a flow diagram depicting a method 700 that may be used. Execution of the method 700 begins at START block 710 and continues to process block 720. At process block 720 a data connection is monitored for activity and compliance with normal operating parameters. Processing continues at decision block 730 where a determination is made whether a problem has been detected. A problem includes any operation that is outside normal operating parameters for the data connection and specifically includes operations that can be outside normal operating parameters but for which the data connection has means to adapt for or to correct such errors. If the determination made at decision block 730 is no, processing continues back at process block 720. If, however, the determination made at decision block 730 is yes, processing continues at process block 740. At process block 740, a status indicator associated with the data connection be monitored is activated. Processing terminates at END block 750.

In this example, the status indicator that is activated can be associated with a specific data connection. The status indicator is activated merely upon detection of some indication of trouble, that is, detection of some mode of operation that is outside a normal operating situation for the data connection. Those of ordinary skill the art will readily recognize that, in conjunction with previously described systems and components, more complex behaviors are possible and desirable, including specifically behaviors previously described in conjunction with other figures. Additional examples of such behaviors are discussed in conjunction with additional flow diagrams that follow.

Figure 8:
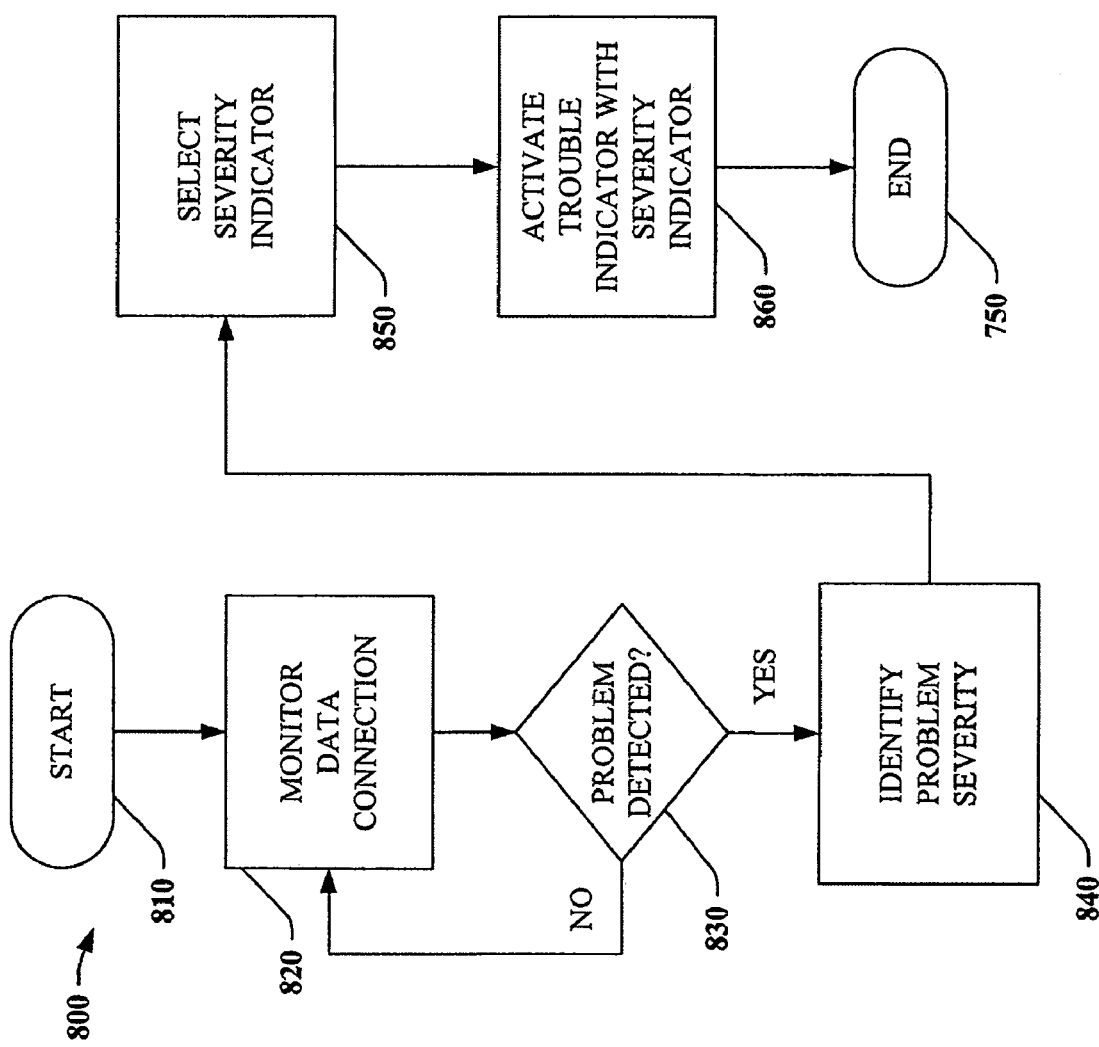
FIG. 8 is a flow diagram depicting a method that can be used with a data port signaling system.

FIG. 8 is a flow diagram depicting a method 800 that can be employed with various components disclosed and described herein. Execution of the method begins at START block 810 and continues to process block 820. At process block 820, a data connection, such as a wired or wireless data connection like those previously described in conjunction with other figures, is monitored. Monitoring looks for operational parameters or attributes of the data connection that are outside normal operational parameters. These normal operational parameters can be described or defined by a specification, such as the USB 2.0 specification or the IEEE 1394 specification, among others. Additionally or alternatively, these parameters can be defined by an implementer.

At decision block 830, a determination is made whether a problem with the data connection has been detected. A problem can be any situation that falls outside the normal expected operational parameters of the data connection, regardless of whether the data connection has sufficient means, such as error correction, to handle such operation outside normal operational parameters. If no problem is detected at decision block 830, processing continues at process block 820. If a problem is detected at decision block 830, processing continues at process block 840 where a severity level of the detected problem is identified. A severity level can be as simple as a flag that indicates whether a detected problem is severe. More complex schemes that include multiple severity levels are also possible. In large part, a definition of a severity level depends on both a specific implementation and implementer.

Processing continues at process block 850 where a severity indicator that corresponds to the severity level is selected. Such severity indicator can represent a mode of operating a trouble indicator associated with the data connection such as a light, a display, or a status indicator as described in conjunction with previous figures. Modes of operation can include activating a light, causing a light to burn steadily or to blink, causing a light to change color, or causing a message to be presented on a display, among others. Those of ordinary skill in the art will recognize that other modes of operation are possible. At process block 860, a trouble indicator is activated and caused to operate in accordance with the severity indicator. Processing terminates at END block 870.

Figure 9:
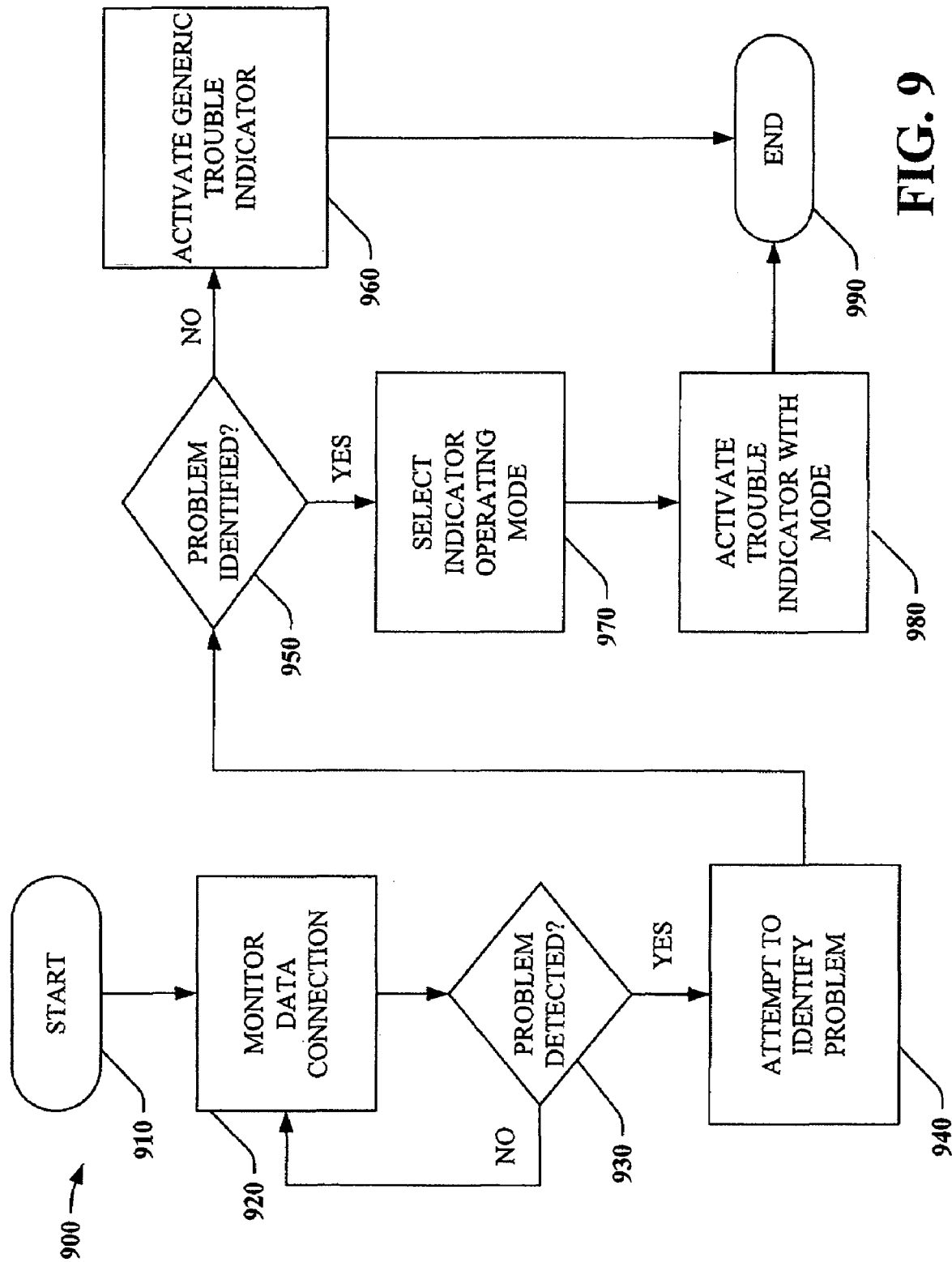
FIG. 9 is a flow diagram depicting a method that can be used with a data port signaling system.

FIG. 9 is a flow diagram depicting a method 900 that may be employed. Processing of the method 900 begins at START block 910. Processing proceeds to process block 920 where a data connection, such as a wired data connection like a USB or FireWire connection, among others, or a wireless data connection, such as a WiFi or WiMax connection, among others, is monitored for normal operation. Processing continues at decision block 930 where a determination is made whether an operational problem has been detected. An operational problem specifically includes a malfunction of the data connection or an error condition, regardless of whether the data connection is capable of adjusting for or correcting for the error.

If the determination made at decision block 930 is no, processing continues at process block 920. If the determination made at decision block 930 is yes, processing continues at process block 940 where an attempt is made to identify the detected a problem. Identification of the detected problem can include in such things as placing the problem into a broad category such as a power problem or a connectivity problem, among others. Identification can also include more specific classifications such as determining that the last device connected to a data connection has requested a reservation of bandwidth in an amount that would exceed the capacity of the data connection. Other identifications are also possible.

At decision block 950, a determination is made whether the detected problem has been identified. If no, processing continues at process block 960 where the trouble indicator is activated and caused to operate in a manner that generically indicates a trouble condition. If the determination made at decision block 950 is yes, processing continues at process block 970 where an indicator operating mode is selected. Processing then continues at process block 980 where the trouble indicator is activated and caused to operate in accordance with the selected operating mode. The operating mode can be used to specifically designate the detected trouble condition. Processing from either process block 960 or process block 980 terminates at END block 990.

Figure 10:
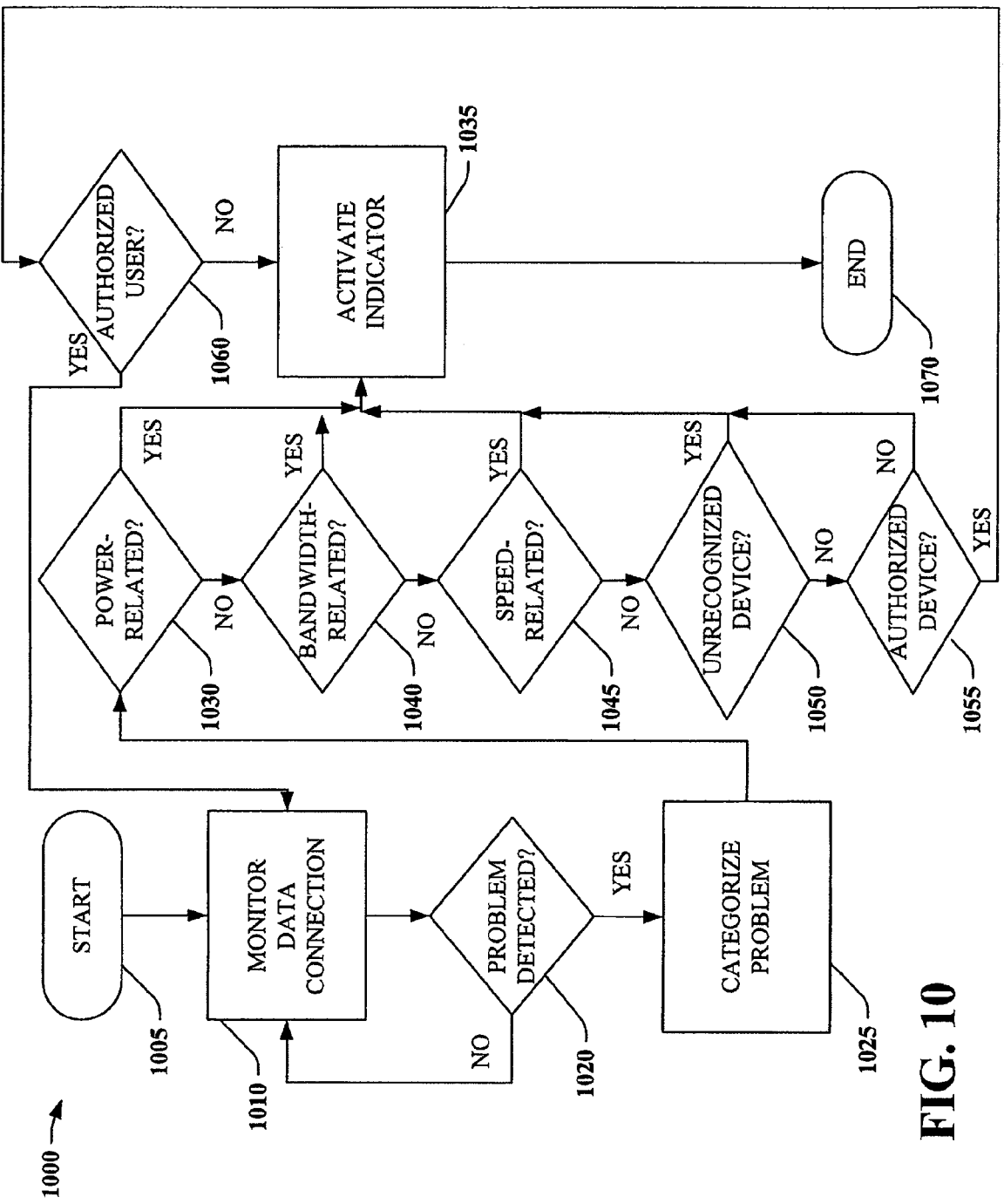
FIG. 10 is a flow diagram depicting a method that can be used with a data port signaling system.

FIG. 10 is a flow diagram depicting a method 1000 that can be used. Processing begins at START block 1005 and continues to process block 1010 where a data connection is monitored. Monitoring of the data connection includes monitoring for compliance with normal operating parameters. Processing continues at decision block 1020 where a determination is made whether a problem with the data connection has been detected. A problem specifically includes a malfunction of the data connection, an abnormal operating condition, an operating condition that triggers an adjustment, an error correction by the data connection in order to continue operating, or another operating parameter that can be defined by an implementer. If the determination made at decision block 1020 is no, processing continues at process block 1010. If the determination made at decision block 1020 is yes, processing continues at process block 1025.

At process block 1025, an attempt is made to categorize the detected problem. Processing continues at decision block 1030 where a determination is made whether the detected problem is a power-related problem. A power-related problem can include a current overdraw, a current under-draw, or a total lack of power for the connection, among others. If the determination made at decision block 1030 is yes, processing continues at process block 1035 where an indicator, such as a light or display associated with the data connection, is activated. If the determination made at decision block 1030 is no, processing continues to decision block 1040 where a determination is made whether the detected problem is a bandwidth-related problem. Bandwidth-related problems include over-reservations available bandwidth and communication conflicts between or among connected devices, among others. If the determination made at decision block 1040 is yes, processing continues to process block 1035. If the determination made a decision block 1040 is no, processing continues to decision block 1045.

At decision block 1045, a determination is made whether the detected problem is a speed-related problem. For example, in the case of a data connection in accordance with the USB 1.1 protocol, a high-speed device may be connected to a low-speed port. Here, the high-speed device can still operate but data transfer speeds will be limited to those supported by the USB 1.1 protocol, that is, full speed or low speed. If the determination made at decision block 1045 is yes, processing continues at process block 1035. If the determination made at decision block 1045 is no, processing will continue at decision block 1050.

A determination is made whether an unrecognized device has been connected to the data connection at decision block 1050. An unrecognized device includes a device that does not properly identify itself because of a device malfunction or another reason. If this determination is yes, processing continues to process block 1035. If the determination made at decision block 1050 is no, processing continues at decision block 1055. At decision block 1055, a determination is made whether a connected device is authorized to be connected. If this determination is no, processing continues at process block 1035.

If the determination made at decision block 1055 is yes, processing continues at decision block 1060 where a determination is made whether the user of the device is authorized to either use the device or attach device to the data connection. If this determination is no, processing continues at process block 1035. If the determination made is yes, processing continues at process block 1010 where the connection is monitored. Processing from process block 1035 terminates at END block 1070.

Figure 11:
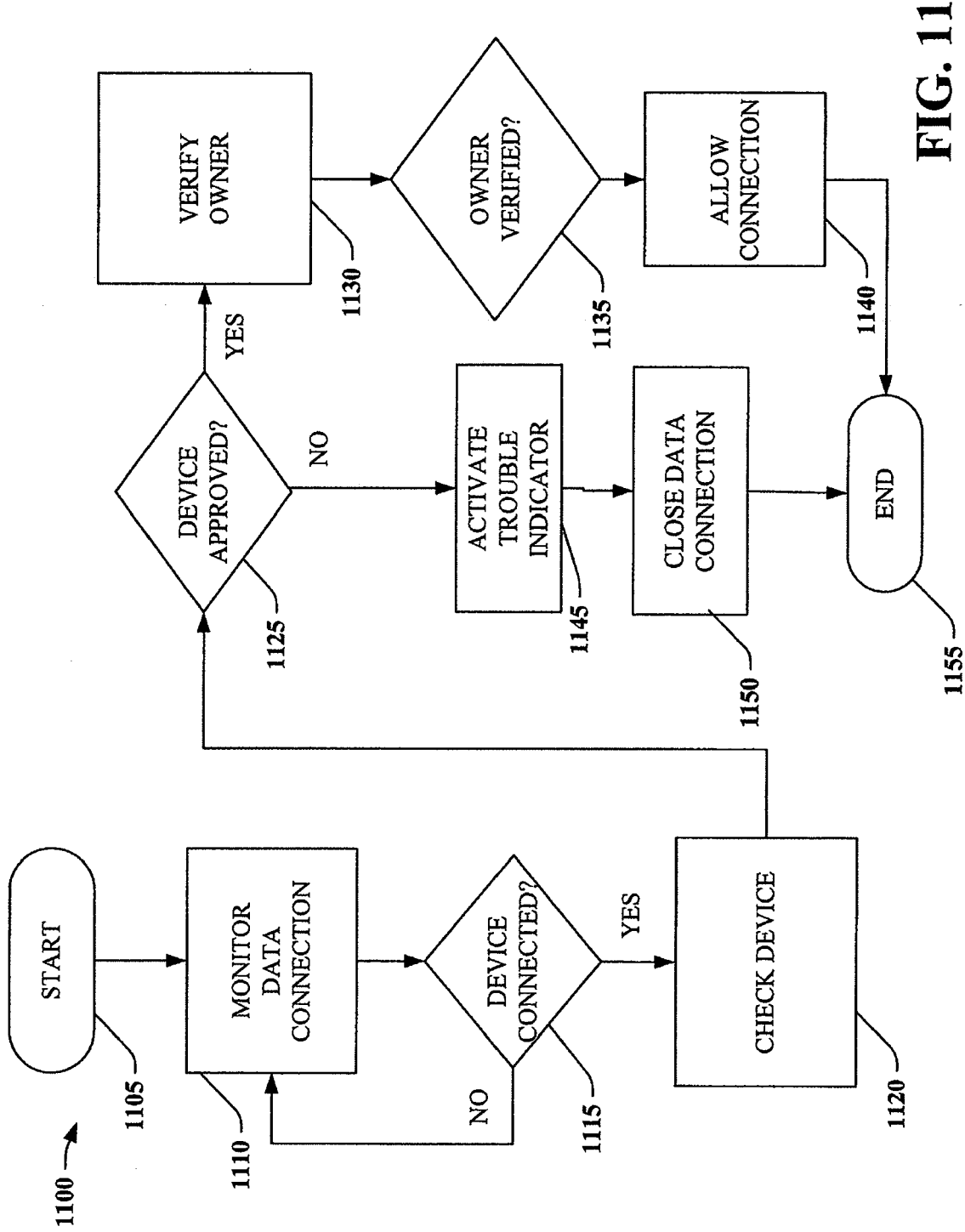
FIG. 11 is a flow diagram of a method that can be used with a data port signaling system.

FIG. 11 is a flow diagram of a method 1100 that can be employed. Execution of the method 1100 begins at START block 1105 and proceeds to process block 1110 where a data connection is monitored. The data connection can be any of the data connections previously described with reference to other figures. Monitoring can include any of the previously described monitoring activities. Processing continues to decision block 1115 where a determination is made whether a device has been connected. If this determination is no, processing continues at process block 1110. If the device has been connected, processing continues at process block 1120 where the connected device is checked. At decision block 1125, a determination is made whether the connected device is approved to be connected. If this determination is yes, processing continues at process block 1130.

At process block 1130, a procedure is invoked to verify an owner of the connected device. At decision block 1135, a determination is made whether the owner of the connected device is verified. If yes, processing continues at process block 1140 where a connection is allowed. If the determination made at decision block 1125 is no, processing continues to process block 1145 where a trouble indicator is activated. The trouble indicator can be a light, a group of lights, a display, or another suitable indicator as previously described with reference to other drawings. Processing then continues at process block 1150 where the data connection is closed. Processing from either process block 1140 or process block 1150 terminates at END block 1155.

Figure 12:
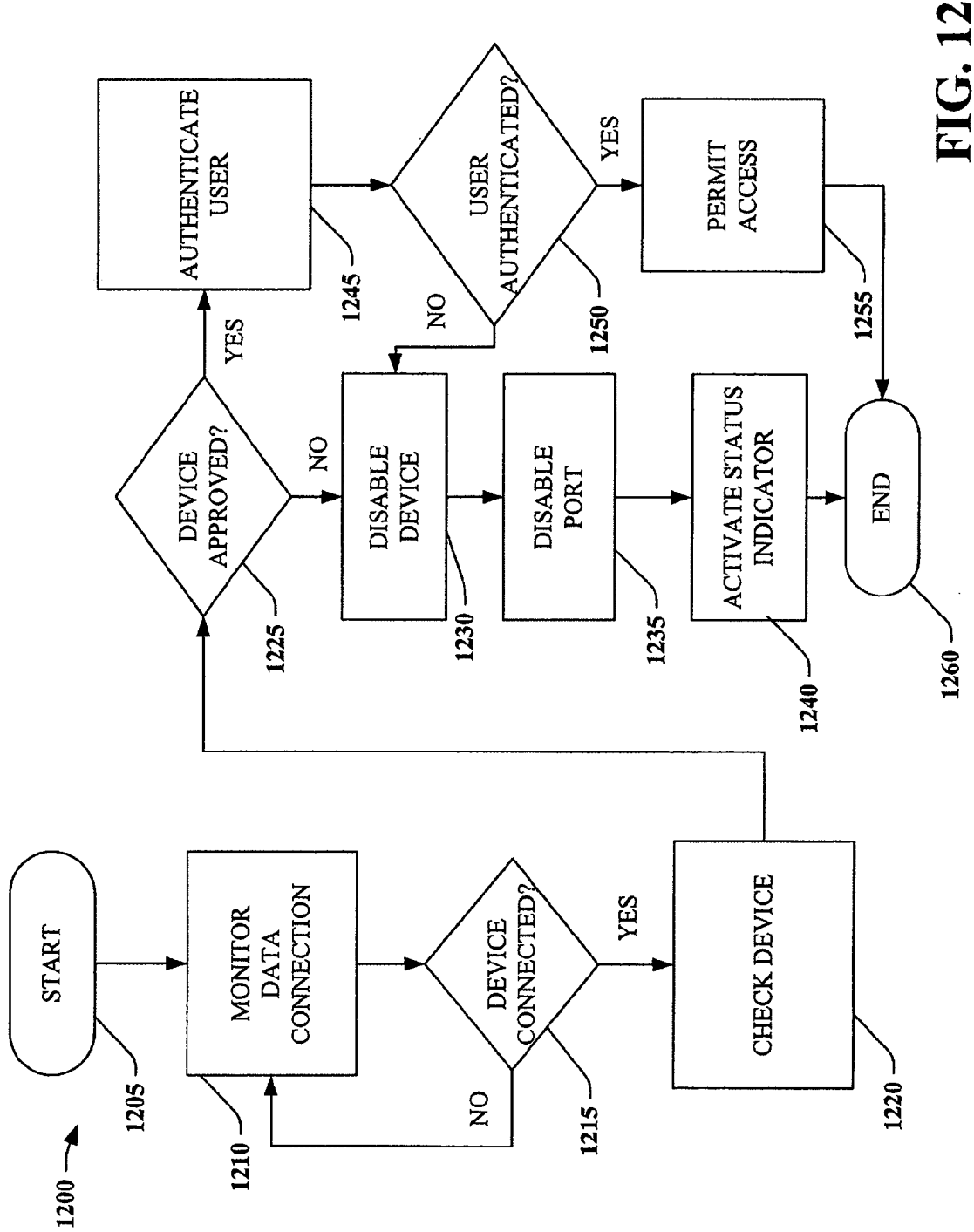
FIG. 12 is a flow diagram depicting a general processing flow that can be used with a data port signaling system.

FIG. 12 is a flow diagram of a method 1200 that can be used. Processing of the method 1200 begins at START block 1205 and continues to process block 1210 where a data connection is monitored. The data connection can be a data connection in accordance with any of the wired or wireless connections previously described with reference to other figures. Monitoring can include any of the monitoring activities previously described in conjunction with other figures. Processing continues at decision block 1215 where a determination is made whether a device has been connected. If this determination is no, processing continues to process block 1210. If this determination is yes, processing continues at process block 1220.

At process block 1220, a device that has been connected is checked. At decision block 1225, a determination is made whether the detected device is an approved device. If this determination is no, processing continues at process block 1230 where the connected device is disabled. Processing continues at process block 1235 where a data connection port to which the now-disabled device was connected is also disabled. Processing continues at process block 1240 where the status indicator that is associated with the data connection (including a specific data port of that connection) is activated.

If the determination made at decision block 1225 is yes, processing continues at process block 1245 where a procedure is invoked to authenticate a user of the connected device. At decision block 1250 a determination is made whether the user has been authenticated. If the determination is no, processing continues at process block 1230. If the determination is yes, processing continues at process block 1255 where access to the data connection is permitted. Processing from either process block 1240 or process block 1255 terminates at END block 1260.

Figure 13:
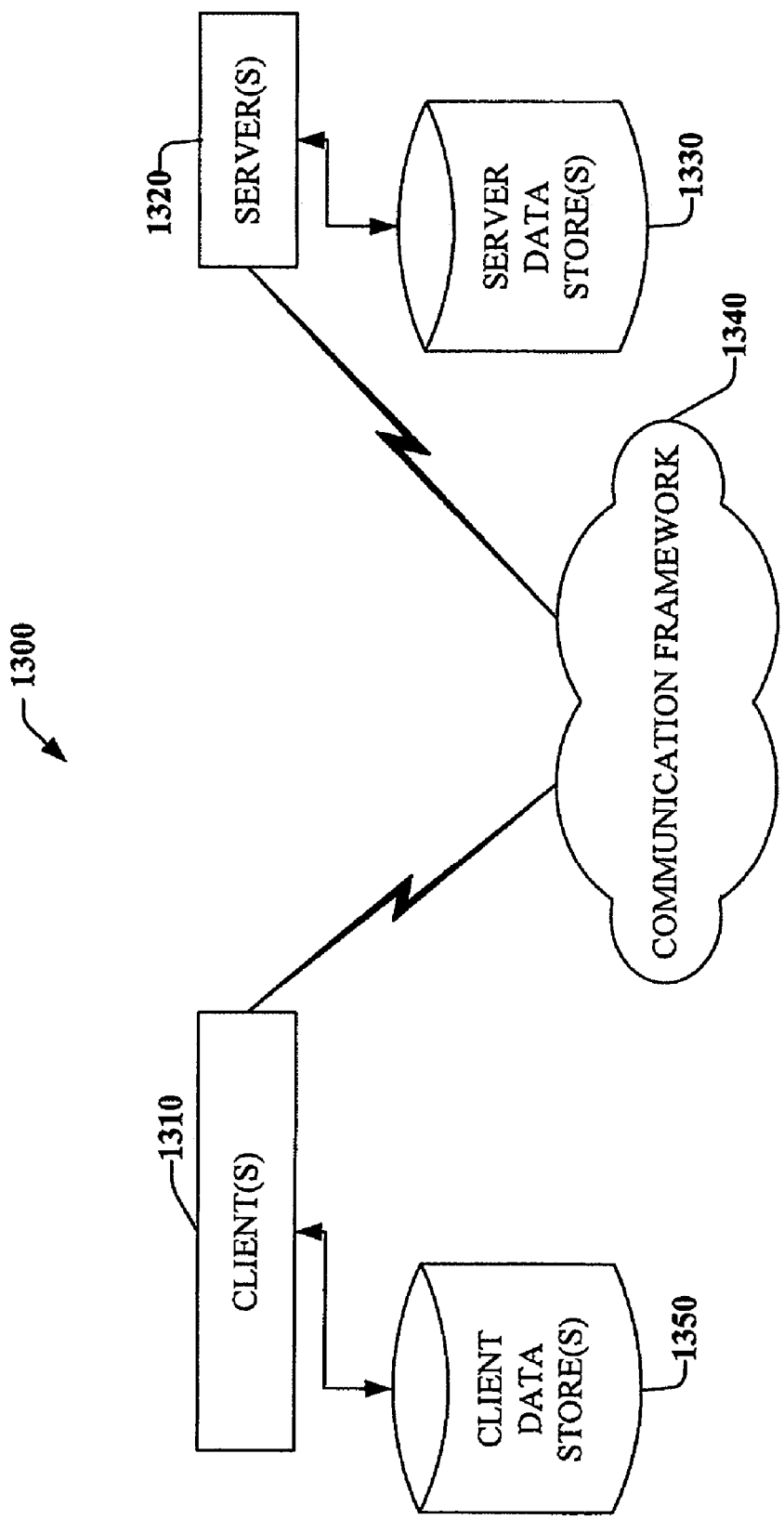
FIG. 13 illustrates an exemplary networking environment, wherein the data port signaling system can be employed.
Figure 14:
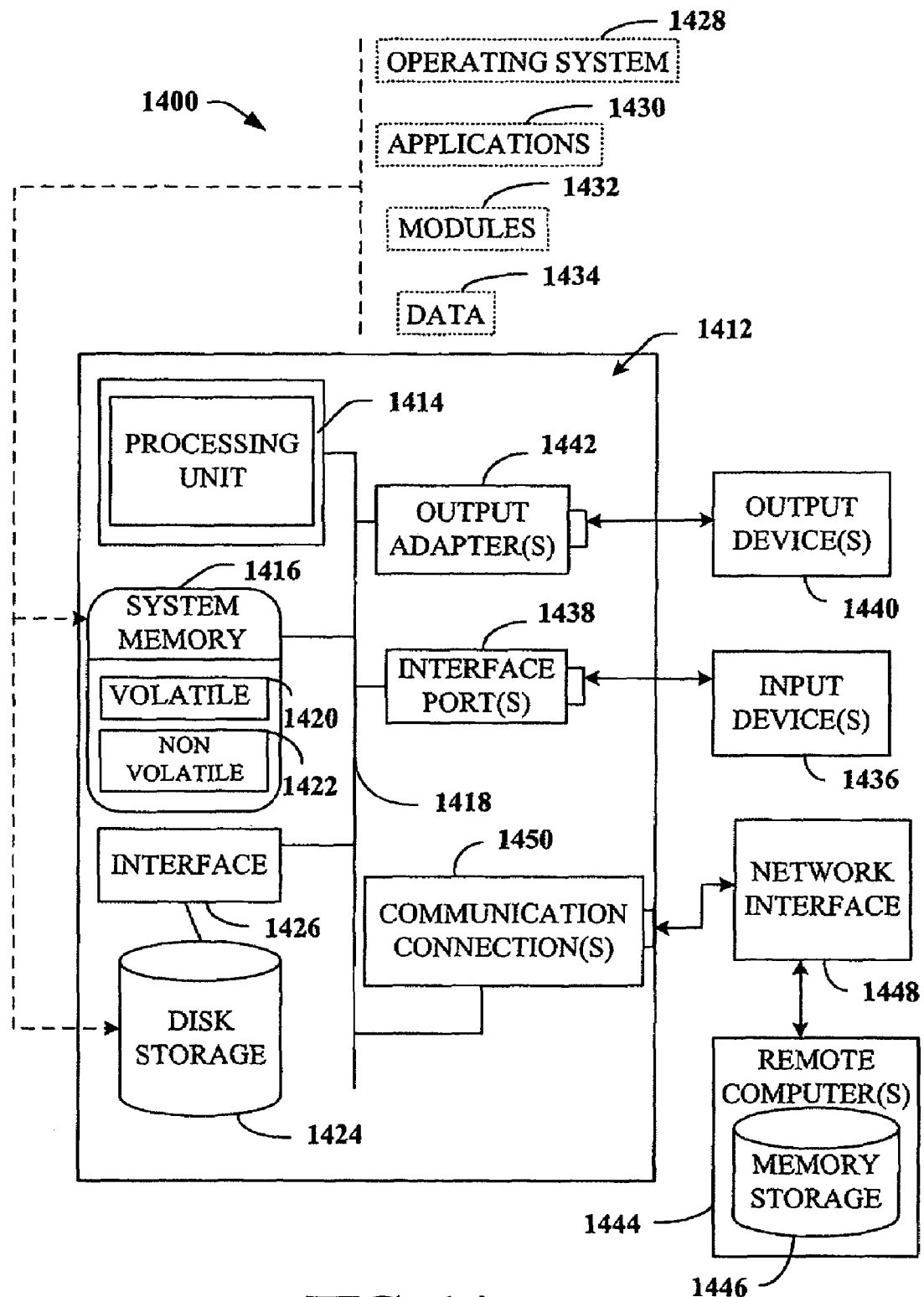
FIG. 14 illustrates an exemplary operating environment, wherein the data port signaling system can be implemented.

In order to provide additional context for implementation, FIGS. 13-14 and the following discussion is intended to provide a brief, general description of a suitable computing environment within which disclosed and described components and methods can be implemented. While various specific implementations have been described above in the general context of computer-executable instructions of a computer program that runs on a local computer and/or remote computer, those skilled in the art will recognize that other implementations are also possible either alone or in combination with other program modules. Generally, program modules include routines, programs, components, data structures, etc. that perform particular tasks and/or implement particular abstract data types.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers. In a distributed computing environment, program modules may be located in local and/or remote memory storage devices.

FIG. 13 is a schematic block diagram of a sample-computing environment 1300 within which the disclosed and described components and methods can be used. The system 1300 includes one or more client(s) 1310. The client(s) 1310 can be hardware and/or software (for example, threads, processes, computing devices). The system 1300 also includes one or more server(s) 1320. The server(s) 1320 can be hardware and/or software (for example, threads, processes, computing devices). The server(s) 1320 can house threads or processes to perform transformations by employing the disclosed and described components or methods, for example. Specifically, one component that can be implemented on the server 1320 is a diagnostic server, such as the diagnostic server 340 of FIG. 3. Additionally, various authentication modules, such as the device authentication unit 640 discussed in conjunction with FIG. 6 can also be implemented as components of the server 1320. Various other disclosed and discussed components can be implemented on the server 1320.

One possible means of communication between a client 1310 and a server 1320 can be in the form of a data packet adapted to be transmitted between two or more computer processes. The system 1300 includes a communication framework 1340 that can be employed to facilitate communications between the client(s) 1310 and the server(s) 1320. The client(s) 1310 are operably connected to one or more client data store(s) 1350 that can be employed to store information local to the client(s) 1310. Similarly, the server(s) 1320 are operably connected to one or more server data store(s) 1330 that can be employed to store information local to the server(s) 1340.

With reference to FIG. 14, an exemplary environment 1400 for implementing various components includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Peripheral Component Interconnect Express (PCI Express), ExpressCard, Card Bus, Universal Serial Bus (USB), Advanced Graphics Port (AGP), Personal Computer Memory Card International Association bus (PCMCIA), Firewire (IEEE 1394), Serial Advanced Technology Attachment (SATA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. For example, FIG. 14 illustrates a disk storage 1424. The disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

The various types of volatile and non-volatile memory or storage provided with the computer 1412 can be used to store components of various implementations of the data port signaling system disclosed and described herein. For example, with reference to FIG. 1, the signal module 140 can be implemented as a software module that can be stored on the disk storage 1424. At runtime, the signal module 140 can be loaded into the volatile memory 1420 from where machine-interpretable code of the signal module 140 can be accessed by the processing unit 1414 and thereby placed into execution.

It is to be appreciated that FIG. 14 describes software that acts as an intermediary between users and the basic computer resources described in the suitable operating environment 1400. Such software includes an operating system 1428. The operating system 1428, which can be stored on the disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the disclosed components and methods can be implemented with various operating systems or combinations of operating systems.

A user enters commands or information into the computer 1412 through input device(s) 1436. The input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. The interface ports 1438 specifically can include various data connection ports that can be used with components disclosed and described herein, such as the data connection port 110 of FIG. 1, among others.

Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wired and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1248 includes, for exemplary purposes only, internal and external technologies such as, modems including regular telephone grade modems, cable modems and DSL modems, ISDN adapters, and Ethernet cards.

What is claimed is:

1. A device comprising:
   a universal serial bus (USB) port for interacting with other devices;
   a status indicator associated with the USB port, the status indicator including at least one of a liquid crystal display (LCD), an audio device, one or more light emitting diodes (LEDs), or an electronic display device; and
   a module configured to identify a data transfer speed associated with the USB port, the module further configured to cause the status indicator to output a first indication in response to an occurrence of data transfer associated with the USB port and to cause the status indicator to output another indication corresponding to the identified data transfer speed, wherein the module is further configured to determine whether the USB port is charging another device connected to the USB port, and to cause the LED to display an indication in response to determining that the USB port is charging the other device.

2. The device as recited in claim 1, wherein the status indicator is at least one LED and wherein the module is further configured to activate the at least one LED in response to the occurrence of data transfer associated with the USB port and to cause the at least one LED to display a color corresponding to the identified data transfer speed.

3. The device as recited in claim 2, wherein the module is further configured to determine whether the USB port is enabled, and wherein the module is further configured to cause the LED to display an indication in response to determining that the USB port is enabled.

4. The device as recited in claim 2, wherein the module is further configured to determine whether the USB port is disabled, and to cause the LED to display an indication in response to determining that the USB port is disabled.

5. The device as recited in claim 2, wherein the module is further configured to determine a status of another device connected to the USB port, and to cause the LED to display an indication in accordance to the determined status.

6. The device as recited in claim 2, wherein the module is further configured to identify a plurality of ranges of data transfer speeds, determine which range corresponds to the identified data transfer speed and to display the color corresponding to the determined range.

7. The device as recited in claim 2, wherein the module is further configured to determine whether the data transfer speed is above 12 Mbps, to cause the LED to display a first color in response to determining that the data transfer speed is above 12 Mbps, and to cause the LED to display a second color in response to determining that the data transfer speed is not above 12 Mbps.

8. One or more computer-readable media encoded with computer-executable instructions for performing steps comprising:
- determining an operational status of a universal serial bus (USB) port on a device;
- identifying a data transfer speed associated with the USB port;
- determining whether the USB port is charging another device connected to the USB port;
- displaying a first indication on a first light emitting diode (LED) to show the operational status;
- displaying a second indication to show the data transfer speed; and
- displaying a third indication to show charging status.

9. The one or more computer-executable media as recited in claim 8, wherein the operational status includes whether the USB port is at least one of enabled or disabled.

10. The one or more computer-executable media as recited in claim 8, wherein the second indication includes causing the first LED to glow a color corresponding to the data transfer speed.

11. The one or more computer-executable media as recited in claim 8, wherein the second indication includes causing a second LED to glow a color corresponding to the data transfer speed.

12. The one or more computer-executable media as recited in claim 8, wherein the data transfer speed is a maximum data transfer speed of which the USB port is capable and wherein the second indicator is displayed before an occurrence of actual data transfer.

13. The one or more computer-executable media as recited in claim 8, wherein the data transfer speed is an actual data transfer speed of the USB port.

14. The one or more computer-executable media as recited in claim 8, wherein the second indication is displayed on the first LED.

15. The one or more computer-executable media as recited in claim 8, wherein the third indication is displayed with a second LED.

16. The one or more computer-executable media as recited in claim 8, wherein the steps further comprising:
- detecting data transfer on the USB port; and
- blinking the first LED to indicate the detected data transfer.

17. An apparatus comprising:
- means for providing a USB port;
- means for incorporating an external indicator light associated with the USB port;
- means for monitoring an operational status of the USB port;
- means for detecting a data transfer speed associated with the USB port;
- means for indicating the operational status with the external indicator light;
- means for indicating the data transfer speed by changing a color of the external indicator light; and
- means for determining a charging status associated with a device connected to the USB port; and
- means for indicating the operational status with the external indicator light.

* * * * *

UNITED STATES PATENT AND TRADEMARK OFFICE
CERTIFICATE OF CORRECTION

| | | |
|---|---|---|
| PATENT NO. | : 7,506,219 B2 | Page 1 of 1 |
| APPLICATION NO. | : 11/214675 | |
| DATED | : March 17, 2009 | |
| INVENTOR(S) | : Firdosh K. Bhesania et al. | |

It is certified that error appears in the above-identified patent and that said Letters Patent is hereby corrected as shown below:

In column 20, line 13, below "and Ethernet cards" insert
-- What has been described above includes illustrative examples of certain components and methods. It is, of course, not possible to describe every conceivable combination of components or methodologies, but one of ordinary skill in the art will recognize that many further combinations and permutations are possible. Accordingly, all such alterations, modifications, and variations are intended to fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (for example, a functional equivalent), even though not structurally equivalent to the disclosed structure, which performs the function in the herein illustrated examples. In this regard, it will also be recognized that the disclosed and described components and methods can include a system as well as a computer-readable medium having computer-executable instructions for performing the acts and/or events of the various disclosed and described methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising." --.

Signed and Sealed this
Third Day of May, 2011

David J. Kappos
*Director of the United States Patent and Trademark Office*